(12) United States Patent
Loiseau et al.

(10) Patent No.: US 9,586,863 B2
(45) Date of Patent: Mar. 7, 2017

(54) COMPOSITIONS AND METHODS FOR WELL COMPLETIONS

(75) Inventors: Anthony Loiseau, Sugar Land, TX (US); Alice Chougnet-Sirapian, L'Hay les Roses (FR); Elena Tomilina, Paris (FR); Simon Gareth James, Le Plessis-Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/814,724

(22) PCT Filed: Aug. 18, 2010

(86) PCT No.: PCT/EP2010/005167
§ 371 (c)(1),
(2), (4) Date: Feb. 28, 2013

(87) PCT Pub. No.: WO2012/022364
PCT Pub. Date: Feb. 23, 2012

(65) Prior Publication Data
US 2013/0153221 A1    Jun. 20, 2013

(51) Int. Cl.
*E21B 33/14*   (2006.01)
*C04B 14/00*   (2006.01)
*C04B 28/02*   (2006.01)
*C09K 8/467*   (2006.01)
*C04B 111/32*   (2006.01)

(52) U.S. Cl.
CPC .............. *C04B 14/00* (2013.01); *C04B 28/02* (2013.01); *C09K 8/467* (2013.01); *E21B 33/14* (2013.01); *C04B 2111/32* (2013.01); *Y02W 30/92* (2015.05)

(58) Field of Classification Search
CPC ......... E21B 33/13; E21B 33/14; C09K 8/467; C09K 8/42
See application file for complete search history.

(56) References Cited

U.S. PATENT DOCUMENTS 2,609,882 A    9/1952   Morgan et al.
3,234,035 A    2/1966   Small et al.
(Continued)

FOREIGN PATENT DOCUMENTS

CA    2720218 A1    10/2009
EA    11139         12/2008
(Continued)

OTHER PUBLICATIONS

Schlumberger, "High-Pressure, High-Temperature Technologies," Oilfield Review, 2008, pp. 46-60.*
(Continued)

*Primary Examiner* — Angela M DiTrani
*Assistant Examiner* — Andrew H Sue-Ako
(74) *Attorney, Agent, or Firm* — Andrea E. Tran (57) ABSTRACT

Incorporation of carbonaceous materials in a cement slurry increases the linear thermal-expansion coefficient of the set cement. When placed in a subterranean well having at least one casing string, cement sheaths with linear thermal-expansion coefficients similar to that of the casing will be subjected to lower compressive and tensile stresses during downhole-temperature changes. Such cement slurries are particularly advantageous in the context of thermal-recovery wells.

5 Claims, 4 Drawing Sheets

(56) References Cited

U.S. PATENT DOCUMENTS

| | | | |
|---|---|---|---|
| 3,376,146 A * | 4/1968 | Mitchell | 106/669 |
| 3,519,449 A | 7/1970 | Babcock | |
| 4,043,828 A | 8/1977 | Gaines | |
| 4,144,077 A | 3/1979 | Gallus | |
| 4,412,863 A | 11/1983 | Neely, Jr. | |
| 4,687,517 A | 8/1987 | Sawaide et al. | |
| 4,721,160 A | 1/1988 | Parcevaux et al. | |
| 4,957,555 A * | 9/1990 | Wheeler et al. | 106/716 |
| 5,002,981 A | 3/1991 | Chiu | |
| 5,226,961 A | 7/1993 | Nahm et al. | |
| 6,015,015 A * | 1/2000 | Luft et al. | 166/384 |
| 6,196,316 B1 * | 3/2001 | Bosma et al. | 166/294 |
| 6,274,525 B1 | 8/2001 | Zborowski et al. | |
| 6,296,057 B2 | 10/2001 | Thiercelin | |
| 6,458,198 B1 | 10/2002 | Baret et al. | |
| 7,156,173 B2 | 1/2007 | Mueller | |
| 7,836,953 B2 * | 11/2010 | Debruijn | C04B 14/022 106/668 |
| 2007/0039734 A1 * | 2/2007 | Di Lullo Arias et al. | 166/292 |
| 2007/0056477 A1 | 3/2007 | Mueller | |
| 2007/0062691 A1 * | 3/2007 | Reddy et al. | 166/250.01 |
| 2008/0196628 A1 | 8/2008 | Santra et al. | |
| 2009/0250219 A1 * | 10/2009 | Debruijn | C04B 14/022 166/294 |

FOREIGN PATENT DOCUMENTS

| | | |
|---|---|---|
| EP | 1129047 | 11/2002 |
| EP | 1348831 | 4/2010 |
| SU | 156511 | 7/1962 |
| SU | 817214 | 3/1981 |
| SU | 1731939 | 5/1992 |
| WO | 00/37387 | 6/2000 |
| WO | 01/70646 | 9/2001 |
| WO | 2007/031736 | 3/2007 |
| WO | 2007/041420 | 4/2007 |

OTHER PUBLICATIONS

Danyushevsky, V.S., et al., "The Reference Book on Cementing Materials," Moscow: Nedra, 1987, pp. 122-124.
Office action for the equivalent Russian patent application No. 2013111826 issued on Mar. 21, 2014.
Office action for the equivalent Canadian patent application No. 2,808,203 issued on Oct. 16, 2014.
Office action for the equivalent Russian patent application No. 2013111826 issued on Oct. 2, 2014.
Bibakov N.K. et al. "Thermal methods of treating oil deposits, Moscow," Nedra, 1988, pp. 3 to 5.
Decision on grant for the equivalent Russian patent application No. 2013111826 issued on Apr. 27, 2015.
Examination Report issued in the related AU application 2010359200, dated Oct. 10, 2013 (3 pages).
Examination Report issued in the related CA application 2808203, dated Feb. 14, 2014 (3 pages).
Examination Report issued in the related CA application 2808203, dated May 13, 2015 (4 pages).
Examination Report issued in the related GC application 2011-19060, dated Jul. 31, 2016 (3 pages).
Office Action issued in the related ID application W-00201300667, dated Dec. 15, 2015 (3 pages).
International Search Report and written opinion issued in the related PCT application PCT/EP2010/005167 dated May 9, 2011 (7 pages).
International Preliminary Report on patentability issued in the related PCT application PCT/EP2010/005167, dated Feb. 19, 2013 (5 pages).
Dargaud B and Baukelifa L: Laboratory Testing, Evaluation, and Analysis of Well Cements in Nelson EB and Guillot D (eds.): Well Cementing (2nd Edition) Schlumberger, Houston, USA (2006) 627-658.
Dutta et al.—Hydration of Portland Cement Clinker in the Presence of Carbonaceous Materials, Cement and Concrete Research 25 (5) 1095-1102, 1995.

* cited by examiner

COMPOSITIONS AND METHODS FOR WELL COMPLETIONS

BACKGROUND OF THE INVENTION

The statements in this section merely provide background information related to the present disclosure and may not constitute prior art.

This invention relates to compositions and methods for treating subterranean formations, in particular, compositions and methods for cementing and completing thermal recovery wells.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone.

The cement sheath achieves hydraulic isolation because of its low permeability. In addition, intimate bonding between the cement sheath and both the tubular body and borehole is necessary to prevent leaks. However, over time the cement sheath can deteriorate and become permeable. Alternatively, the bonding between the cement sheath and the tubular body or borehole may become compromised. The principal causes of deterioration and debonding include physical stresses associated with tectonic movements, temperature changes and chemical deterioration of the cement.

Development of heavy oil reserves often involves applying heat to the producing reservoir. Such thermal-recovery wells frequently employ steam injection. Steam injection encompasses a number of techniques, including steam assisted gravity drainage (SAGD), cyclic steam stimulation (CSS) and steamflooding. During such operations, the resulting well temperature may vary from 150° to 700° C., subjecting the cement sheath to especially severe stresses and possibly leading to cement-sheath failure, formation of microannuli or both. Indeed, a significant percentage of thermal-recovery wells suffer from various forms of leaks including complete steam breakthrough to surface.

There have been several proposals to solve the problems of cement-sheath deterioration. One approach is to design the cement sheath to mechanically survive physical stresses that may be encountered during its lifetime (U.S. Pat. No. 6,296,057). Another approach is to employ additives that improve the physical properties of the set cement. U.S. Pat. No. 6,458,198 describes the addition amorphous metal fibers to improve the strength and impact resistance. EP 1129047 and WO 00/37387 describe the addition of flexible materials (rubber or polymers) to confer a degree of flexibility to the cement sheath. WO 01/70646 describes cement compositions that are formulated to be less sensitive to temperature fluctuations during the setting process. However, these solutions are not as effective in the context of thermal-recovery wells. The stresses may be too severe for the solutions to be effective, the active material may not be stable at such high temperatures, or both.

Therefore, despite the valuable contributions of the prior art, a need still remains for improved cement formulations that can better withstand the thermal and mechanical stresses associated with thermal-recovery wells.

SUMMARY OF THE INVENTION

The present invention allows improvements by providing cement formulations that, when set, have linear thermal-expansion coefficients that are ideally equal to that of the casing in the subterranean well. When the cement sheath and casing expand similarly as heat is applied to the well, the resulting stresses on the cement sheath and the cement/casing bond are minimized, thereby helping to preserve zonal isolation in the well.

In an aspect, embodiments of the invention relate to methods for adjusting the thermal-expansion properties of a cement formulation for placement in a subterranean well.

In a further aspect, embodiments of the invention relate to methods for controlling thermal and mechanical stresses in a cement sheath in a subterranean well.

In yet a further aspect, embodiments of the invention aim at uses of at least one carbonaceous material to adjust the thermal-expansion properties of set cement placed in a subterranean well.

DETAILED DESCRIPTION

The invention may be described in terms of treatment of vertical wells, but is equally applicable to wells of any orientation. The invention may be described for hydrocarbon production wells, but it is to be understood that the invention may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Most materials expand when they are heated because, as the temperature increases, the distance between the atoms also increases. Thermal expansion may be expressed in various ways. The linear coefficient of thermal expansion (LCTE) describes the specific linear elongation of a material per unit value of temperature and at a constant pressure. The areal coefficient of thermal expansion (ACTE) relates the change in a material's area dimensions as a function of temperature. The volumetric coefficient of thermal expansion (VCTE) describes the change in volume of a material per unit value of temperature. For exactly isotropic materials, the VCTE is three times the LCTE.

A typical LCTE for a conventional set Portland cement is about $8 \cdot 10^{-6}/°$ C., whereas the typical LCTE for carbon steel is about $13 \cdot 10^{-6}/°$ C. Thus, when a cement sheath around steel casing is subjected to a thermal load, the dimensions of the cement and casing will change and diverge from each other. In the presence of thermal loads associated with thermal-recovery wells, the dimensional divergence may induce significant mechanical stresses on the cement sheath, leading to the formation of a microannulus, cement-sheath failure in both tensile and compressive modes, or both. The present invention minimizes the aforementioned stresses by providing set cements whose LCTEs are more compatible with the casing LCTE.

Figure 1:
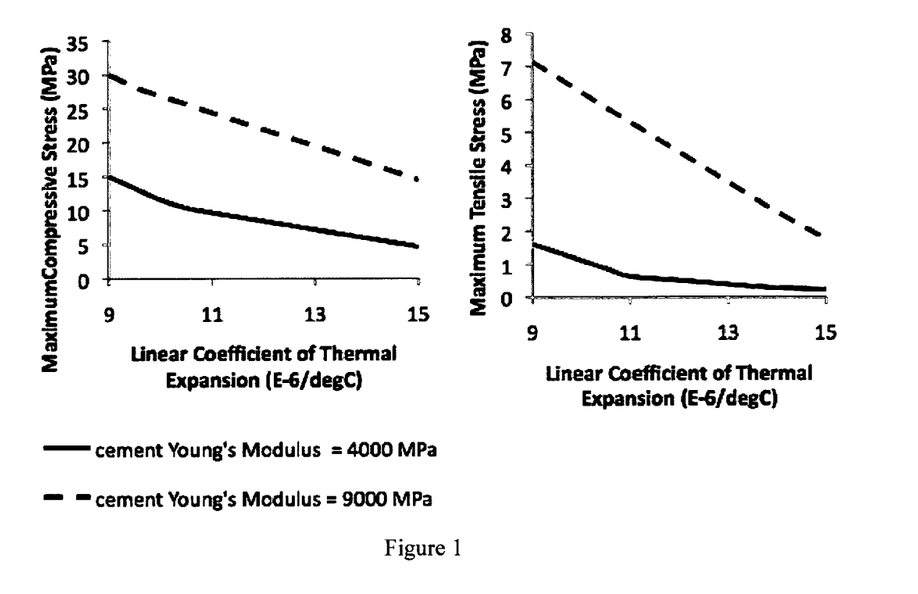
FIG. 1 presents two graphs that show how the maximum compressive and tensile stresses in a cement sheath vary with the linear thermal-expansion coefficient of the set cement, when the well temperature is increased linearly from 10° to 250° C.
Figure 2:
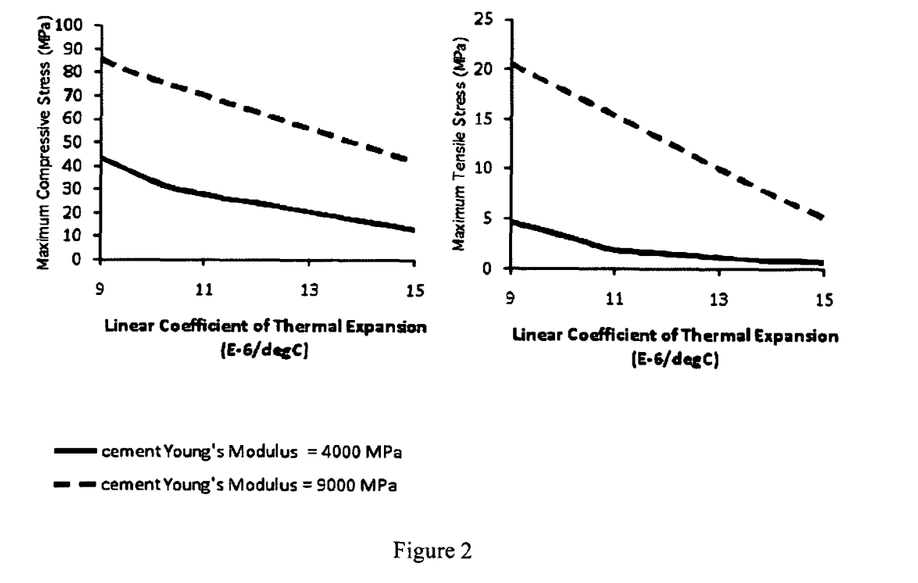
FIG. 2 presents two graphs that show how the maximum compressive and tensile stresses in a cement sheath vary with the linear thermal-expansion coefficient of the set cement, when the well temperature is increased linearly from 10° to 700° C.

The influence of the LCTE on compressive and tensile stresses in a cement sheath is illustrated in FIGS. 1 and 2. Two cement formulations with different Young's moduli were considered in the simulation. The properties of the casing and the formation are given in Table 1. The stresses were calculated for two scenarios: one during which the casing was linearly heated from 10° to 250° C.; the other involving the linear heating of the casing from 10° to 700° C. The time period for both scenarios was 3 days.

TABLE 1

Formation and casing properties for stress simulations presented in FIGS. 1 and 2. FIGS. 1 and 2 show that, for both cement systems, the compressive and tensile stresses decrease as the LCTE approaches that of the steel-$13 \cdot 10^{-6}/°$ C.

Formation properties

| | |
|---|---|
| Density | 2300 kg/m$^3$ |
| Young Modulus | 4000 and 9000 MPa |
| Poisson's Ratio | 0.425 |
| Thermal Conductivity | 1.83 W/(m · °K) |
| Specific Heat Capacity | 710 J/(kg · °K) |
| Linear Thermal Expansion Coefficient | $13 \cdot 10^{-6}/°$ C. |
| Open hole | 400.0 mm |

Inner Casing

| | |
|---|---|
| Material Name | Steel |
| Density | 8000 kg/m$^3$ |
| Casing OD | 298.45 mm |
| Casing ID | 273.61 mm |
| Standoff | 80% |

TABLE 1-continued

Formation and casing properties for stress simulations presented in FIGS. 1 and 2. FIGS. 1 and 2 show that, for both cement systems, the compressive and tensile stresses decrease as the LCTE approaches that of the steel-$13 \cdot 10^{-6}/°$ C.

| | |
|---|---|
| Young Modulus | 200,000 MPa |
| Poisson's Ratio | 0.27 |
| Weight | 89.29 kg/m |
| Thermal Conductivity | 15 W/(m · K) |
| Specific Heat Capacity | 500 J/(kg · K) |
| Linear Thermal Expansion Coefficient | $13 \cdot 10^{-6}/°$ C. |

FIGS. 1 and 2 also show that compressive and tensile stresses in the cement sheath remain low when the set-cement LCTE exceeds that of the steel casing. Indeed, as shown in FIGS. 3 and 4, the LCTE of the set cement may be significantly higher than that of the casing before deleterious effects occur—in the form of microannuli.

Certain properties of the casing, cement and formation are given in Table 2. All other parameters are the same as those described in Table 1.

TABLE 2

Figure 3:
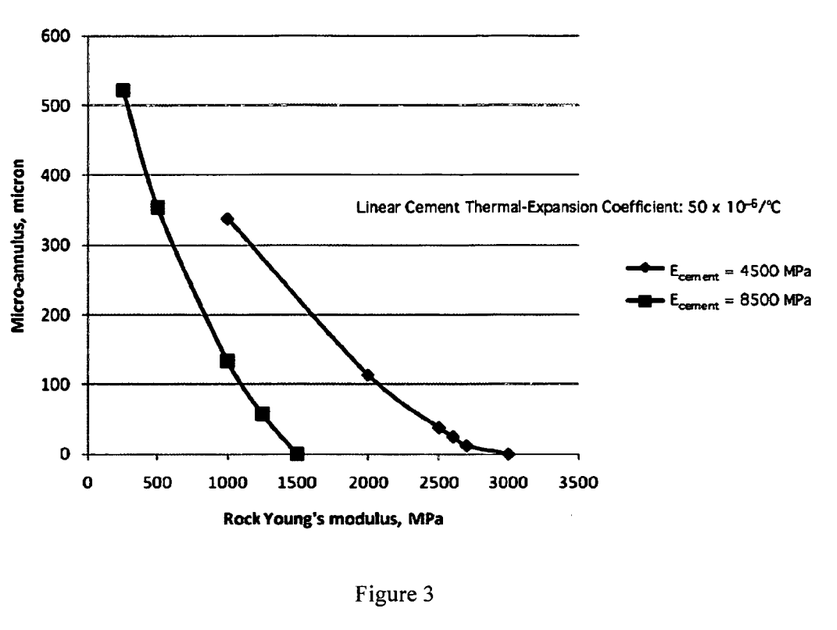
FIG. 3 is a graph showing how the formation of a microannulus between casing and set cement is influenced by the Young's moduli of the formation and the cement sheath.
Figure 4:
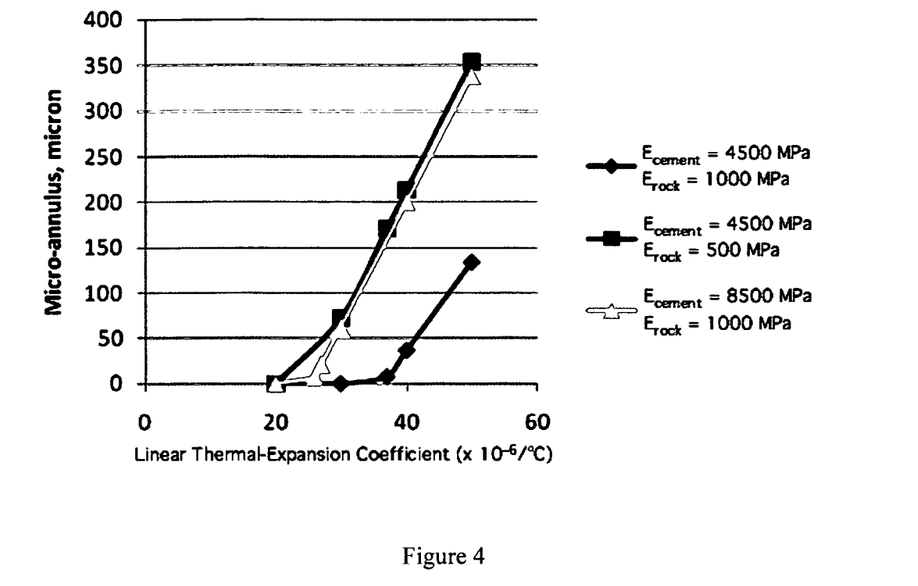
FIG. 4 is a graph showing how the formation of a microannulus between casing and set cement is influenced by the linear thermal-expansion coefficient of the set cement, and the Young's moduli of the formation and the cement sheath.

Formation, cement and casing properties for stress simulations presented in FIGS. 2 and 3.

| | | | |
|---|---|---|---|
| Open Hole | 216 mm (8.5 in.) | Formation Poisson's ratio | 0.3 |
| Casing | 178 mm (7.0 in.), 38.7 kg/m | Young's modulus | variable |
| Linear Thermal-Expansion Coefficient | $13 \cdot 10^{-6}/°$ C. | Cement | |
| Standoff | 100% | Poisson's ratio | 0.15 |
| | | Young's modulus | 4500 or 8500 MPa |
| Temperature Ramp | 20° to 260° C. in 4 hours | | |

FIG. 3 is a plot of microannulus width versus rock Young's modulus. The linear thermal-expansion coefficient is significantly higher than that of steel casing—$50 \cdot 10^{-6}/°$ C. Two cement Young's moduli were considered—4500 MPa and 8500 MPa. The results show that, as long as the rock Young's modulus is greater than about 33% of the cement Young's modulus, no microannulus will occur.

FIG. 4 is a plot of microannulus width versus the cement linear thermal-expansion coefficient. Three Young's-modulus conditions are considered, whereby the cement and rock Young's moduli are varied. The results show that the microannulus width is not only a function of the cement thermal-expansion coefficient, but also of the ratio between the cement and rock Young's moduli. The results show that a cement thermal-expansion of $20 \cdot 10^{-6}/°$ C. is an upper limit beyond which exists a risk of forming a microannulus if there is a large difference between the cement and rock Young's moduli (e.g., a factor of 8 or 9).

The inventors have surprisingly discovered that the thermal-expansion properties of a cement system may be adjusted by incorporating at least one carbonaceous material in the slurry formulation. Preferred carbonaceous materials include (but are not limited to) one or more members of the list comprising delayed coke, fluid coke, calcined coke, asphalt, charcoal, coal, anthracite, graphite, flake coke, amorphous pitch coke, tar coke, anode coke, metallurgical coke, amorphous graphite, lignite, bituminous coal, sub-bituminous coal, exinite, vitrinite, intertinite, fine kolite, activated carbon and gilsonite. Delayed coke may occur in one or more forms, including (but not limited to) shot, sponge, needle, maze, calcined and green. Even more preferred carbonaceous materials are chosen from the list consisting of coke, kolite or coal and mixtures thereof. The most preferred carbonaceous compound to be used being coke.

Embodiments of the invention relate to methods for adjusting the thermal-expansion properties of a cement system for placement in a subterranean well having at least one casing string. The method comprises incorporating a carbonaceous material in the cement system, such that the linear thermal-expansion coefficient of the set cement is higher than that of a set cement not containing the carbonaceous material. Such linear coefficient of thermal expansion being preferably lower than or equal to about $50 \cdot 10^{-6}/°$ C. A more preferred linear thermal-expansion-coefficient range is between about $11 \cdot 10^{-6}/°$ C. and $20 \cdot 10^{-6}/°$ C., and an even more preferred linear thermal-expansion coefficient range is between about $11 \cdot 10^{-6}/°$ C. and $17 \cdot 10^{-6}/°$ C.

Further embodiments of the invention relate to methods for controlling thermal and mechanical stresses in a cement sheath in a subterranean well. The method comprises installing at least one casing string in the well whose linear thermal-expansion coefficient is known. A cement slurry comprising at least one carbonaceous material is formed such that, after setting, it has a linear thermal-expansion coefficient higher than that of set cement not containing the carbonaceous material. Such linear coefficient of thermal expansion being preferably lower than or equal to about $50 \cdot 10^{-6}/°$ C. A more preferred linear thermal-expansion-coefficient range is between about $11 \cdot 10^{-6}/°$ C. and $20 \cdot 10^{-6}/°$ C., and an even more preferred linear thermal-expansion coefficient range is between about $11 \cdot 10^{-6}/°$ C. and $17 \cdot 10^{-6}/°$ C. The cement slurry is pumpable and is placed in the well adjacent to the casing string and then allowed to set. Those skilled in the art will recognize that a pumpable cement slurry has a viscosity preferably below about 1000 mPa-s at a shear rate of $100$ s$^{-1}$, throughout the temperature range the slurry will experience during placement in the well.

Yet further embodiments of the invention aim at uses of at least one carbonaceous material to adjust the linear thermal-expansion properties of set cement placed in a subterranean well having at least one casing string. The incorporation of the carbonaceous material allows one to control the thermal and mechanical stresses exerted upon the cement sheath in the well. The cement slurry is formulated such that, after setting, it has a linear thermal-expansion coefficient higher than that of a set cement not containing the carbonaceous material. Such linear coefficient of thermal expansion being preferably lower than or equal to about $50 \cdot 10^{-6}/°$ C. A more preferred linear thermal-expansion-coefficient range is between about $11 \cdot 10^{-6}/°$ C. and $20 \cdot 10^{-6}/°$ C., and an even more preferred linear thermal-expansion coefficient range is between about $11 \cdot 10^{-6}/°$ C. and $17 \cdot 10^{-6}/°$ C.

For all aspects of the invention, the preferred carbonaceous-material concentration may be between about 10% and about 60% by weight of cement, and preferably between about 11% and 50% by weight of cement, even more preferably between 15% and 40% by weight of cement. The particle-size range of the carbonaceous material may be between about 1 μm and 1200 μm, preferably between 40 μm and 1000 μm and more preferably between about 90 μm and 800 μm.

For all aspects of the invention, the cement may comprise one or more members of the list comprising Portland cement, calcium aluminate cement, fly ash, blast furnace slag, lime-silica blends, geopolymers, Sorel cements, chemically bonded phosphate ceramics, cement-kiln dust and zeolites. In a preferred embodiment, the cement is Portland cement.

The well may be a thermal-recovery well, preferably the well temperature is comprised between 150° C. and 700° C. If the cement slurry comprises Portland cement, silica may be added to prevent strength retrogression at the high temperatures associated with thermal-recovery wells. Depending on the ultimate temperature, the silica concentration may be adjusted such that the calcium oxide-to-silicon dioxide ($CaO/SiO_2$) ratio is between about 0.6 and 1.2. Such compositions may promote the formation of beneficial calcium-silicate-hydrate minerals such as xonotlite and truscottite. Under these circumstances, the silica concentration in the cement slurry may be between about 20% and 60% by weight of cement, and preferably between about 25% and 45% by weight of cement. The particle size of the silica may vary from 0.1 μm to 200 μm, preferably from 1 μm to 80 μm, even more preferably from 2 μm to 80 μm. In a preferred version, the silica used is silica sand.

The cement slurry may further comprise one or more members of the list comprising accelerators, retarders, dispersants, fluid-loss additives, extenders, swellable materials, pozzolans, fibers and antifoam agents. The cement-slurry density may be adjusted by adding extenders or weighting agents, which include (but are not limited to) glass microspheres, composite microsphere components (such as described in U.S. Pat. No. 7,767,629), ceramic microspheres, hematite, ilmenite, barite, sand, silica and manganese tetraoxide. The density of the cement slurry involved in the various embodiments as described above is preferably from 1100 kg/m$^3$ to 2300 kg/m$^3$, more preferably from 1400 kg/m$^3$ to 1900 kg/m$^3$ and even more preferably from 1500 kg/m$^3$ to 1850 kg/m$^3$.

EXAMPLES

The following examples are not limiting and serve to further illustrate the invention.

Example 1

The influence of various carbonaceous materials on set-cement linear thermal-expansion properties was investigated. The cement-slurry compositions are given in Table 3.

TABLE 3

Compositions of Cement Slurries Containing Various Carbonaceous Materials

| Slurry # | | 1 | 2 | 3 | 4 | 5 |
|---|---|---|---|---|---|---|
| Slurry Density (kg/m$^3$) | | 1900 | 1833 | 1660 | 1650 | 1780 |
| Class G | | 100 | 100 | 100 | 100 | 100 |
| Silica Flour (% BWOC) | | — | 40 | 35 | 35 | 35 |
| Carbonaceous material (% BWOC) | Coke | — | — | 42 | — | — |
| | Coal | — | — | — | 40 | — |
| | Anthracite | — | — | — | — | 56 |

The concentrations by weight of the carbonaceous materials were chosen so that their respective volumetric concentrations in the cement matrix were equal—20%. The solids volume fractions (SVF) of the slurries were also equal—49%. The coke used was delayed petroleum coke having an average particle size of about 90 μm; the coal material was fine kolite having an average particle size of about 200 μm; the anthracite was having an average particle size of about 180 μm. Cement slurries were prepared and cured according to the standard methods given in the following publication: "Petroleum and Natural Gas Industries—Cements and Materials for Well Cementing—Part 2: Testing of Well Cements," International Organization for Standards Publication No. 10426-2. After preparation, the cement slurries were poured into molds with the following dimensions: 30 mm×30 mm×120 mm. The molds were then placed in curing chambers for one week at a temperature between 35° and 65° C. and at 13.7 MPa pressure.

The LCTEs of the cement systems were then measured by the mechanical-dilatometry technique. The technique and apparatus are described in the following publication: Dargaud B and Boukelifa L: "Laboratory Testing, Evaluation, and Analysis of Well Cements," in Nelson E B and Guillot D (eds.): *Well Cementing* (2$^{nd}$ Edition) Schlumberger, Houston, USA (2006) 627-658. The set-cement-sample temperature was increased from 20° to 80° C. The heating was performed in 10° C. increments. The duration of each heating increment was one hour. After each heating increment, the sample temperature was held constant for a 3-hour period. The pressure was ambient. The results, presented in Table 4, show that a variety of carbonaceous materials effective increase the LCTE compared to the control (Slurry #1).

TABLE 4

Linear thermal-expansion coefficients for set cements containing various carbonaceous materials.

| | Slurry # | | | | |
|---|---|---|---|---|---|
| | 1 | 2 | 3 | 4 | 5 |
| Linear Thermal Expansion Coefficient ($\cdot 10^{-6}/°$ C.) | 9 | 10 | 13 | 13.5 | 11 |

Example 2

Following the experimental protocol described in Example 1, the effect of carbonaceous-material concentration on the set-cement LCTE was studied. In this example, the carbonaceous material was delayed coke, and the cement-slurry compositions are presented in Table 5. The results, presented in Table 6, show that the LCTE increases with the coke concentration.

TABLE 5

Compositions of cement slurries containing various coke concentrations.

| Slurry # | 6 | 7 | 8 | 9 | 10 | 11 |
|---|---|---|---|---|---|---|
| Slurry density (kg/m$^3$) | 1900 | 1833 | 1660 | 1660 | 1690 | 1670 |
| Class G cement | 100 | 100 | 100 | 100 | 100 | 100 |
| Silica Flour (% BWOC) | — | 40 | 35 | 40 | 35 | 40 |
| Carbonaceous material (% BWOC) | — | — | 42 | 43 | 15 | 53 |

TABLE 6

Linear thermal-expansion coefficients for set cements containing various amounts of coke.

| Slurry # | 6 | 7 | 8 | 9 | 10 | 11 |
|---|---|---|---|---|---|---|
| Linear Thermal Expansion Coefficient ($\cdot 10^{-6}/$deg C.) | 9 | 10 | 13 | 13 | 13 | 15 |

Example 3

Following the experimental protocol of Example 1, the influence of metallurgical coke particle-size on the set-cement LCTE was studied. Using the composition of Slurry #8 in Example 2, the $d_{50}$ of one coke powder was 160 μm, and the other was 450 μm. As shown in Table 7, the LCTE increased with the $d_{50}$ of the coke powder.

TABLE 7

Influence of coke particle size on linear set-cement thermal-expansion coefficient.

| | Coke powder $d_{50}$ | |
|---|---|---|
| | 160 μm | 450 μm |
| Linear Thermal Expansion Coefficient ($\cdot 10^{-6}/°$ C.) | 13 | 15 |

The invention claimed is:

1. A method, comprising:
   (i) selecting at least one casing string having a casing linear thermal expansion coefficient (LCTE);
   (ii) preparing a set cement slurry that contains at least one carbonaceous material, and measuring a set cement LCTE of the set cement slurry,
      wherein the carbonaceous material is one or more members selected from the group consisting of delayed coke, fluid coke, calcined coke, asphalt, charcoal, coal, anthracite, graphite, flake coke, amorphous pitch coke, anode coke, tar coke, metallurgical coke, amorphous graphite, lignite, bituminous coal, subbituminous coal, exinite, vitrinite, intertinite, gilsonite, kolite, needle coke and activated carbon;
   (iii) comparing the casing LCTE to the set cement LCTE;
   (iv) if the set cement LCTE is higher than the casing LCTE, and is between $11 \cdot 10^{-6}/°$ C. and $15 \cdot 10^{-6}/°$ C., proceed to step (v); if not, repeat steps (ii) and (iii) by adjusting the set cement LCTE, such adjustment comprising varying a type, a concentration or a particle size of the at least one carbonaceous material until the set cement LCTE is higher than the casing LCTE and between $11 \cdot 10^{-6}/°$ C. and $15 \cdot 10^{-6}/°$ C.;
   (v) installing the casing string in a thermal recovery well;
   (vi) performing a cementing operation such that the cement slurry is placed adjacent to the at least one casing string, and allowing the cement slurry to set in the thermal recovery well; and
   (vii) applying heat to the thermal recovery well such that a well temperature varies between 150° C. and 700° C., causing the at least one casing string and the set cement slurry to undergo linear expansion without the formation of a microannulus between the at least one casing string and the set cement.

2. The method of claim 1, wherein the carbonaceous-material concentration is between 10% and 60% by weight of cement.

3. The method of claim 1, wherein the carbonaceous-material particle size is between 1 μm and 1200 μm.

4. The method of claim 1, wherein the cement slurry further comprises one or more members selected from the group consisting of accelerators, retarders, dispersants, fluid-loss additives, extenders, swellable materials, pozzolans, fibers and antifoam agents.

5. The method of claim 1, wherein the cement slurry density is adjusted by adding one or more members selected from the group consisting of glass microspheres, ceramic microspheres, hematite, ilmenite, barite and manganese tetraoxide.

* * * * *